No. 740,719.  
PATENTED OCT. 6, 1903.  
T. C. WALKER, Jr.  
FRICTION CLUTCH COUPLING.  
APPLICATION FILED FEB. 3, 1903.  
NO MODEL.
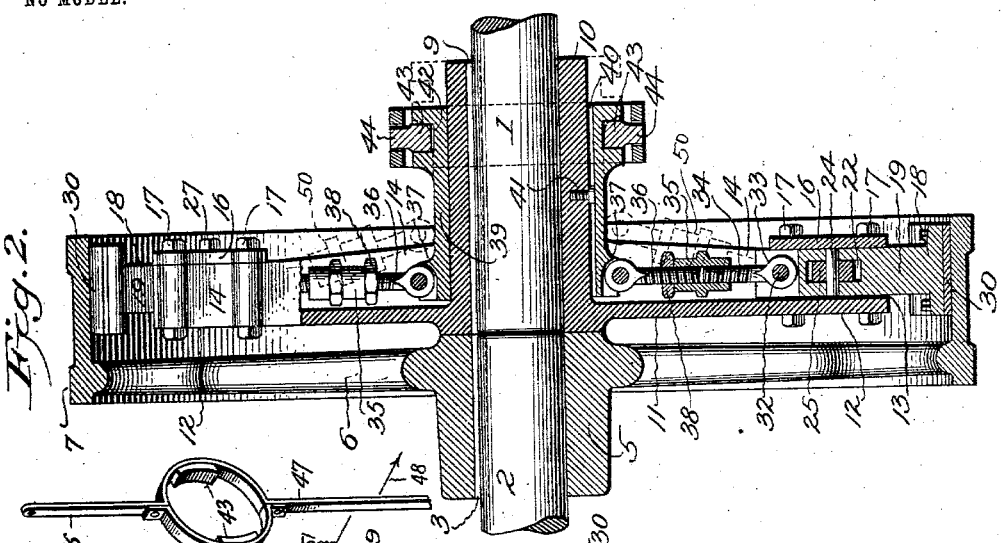
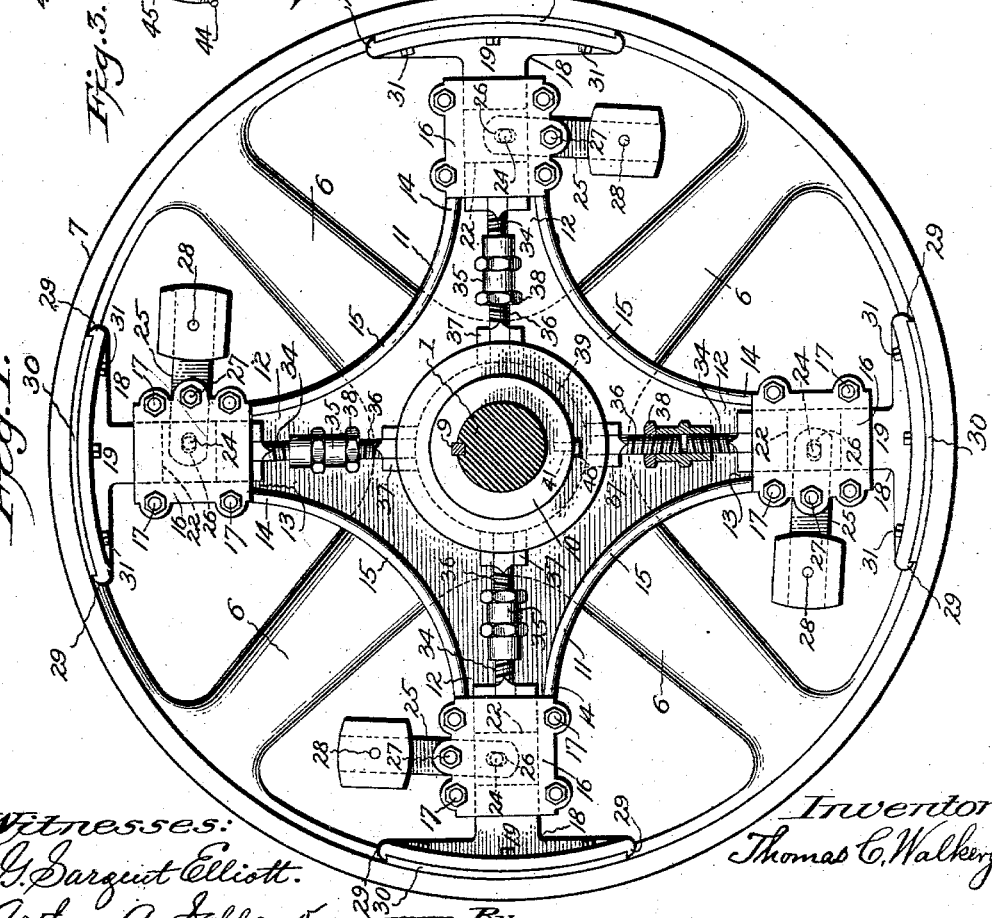
Witnesses:  
G. Sargent Elliott.  
Arthur A. Selleck.
Inventor:  
Thomas C. Walker Jr.  
By H. S. Bailey, Attorney.

No. 740,719. Patented October 6, 1903.

UNITED STATES PATENT OFFICE.

THOMAS CORNELIUS WALKER, JR., OF DENVER, COLORADO.

FRICTION-CLUTCH COUPLING.

SPECIFICATION forming part of Letters Patent No. 740,719, dated October 6, 1903.

Application filed February 3, 1903. Serial No. 141,699. (No model.)

*To all whom it may concern:*

Be it known that I, THOMAS CORNELIUS WALKER, Jr., a citizen of the United States of America, residing at Denver, in the county of Denver and State of Colorado, have invented certain new and useful Improvements in Friction-Clutch Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in friction-clutch couplers, and the objects of my invention are, first, to provide a friction-clutch coupler adapted to be used for a shaft cut-off or a pulley-coupler and for various other purposes—such as hoister-drums and for use on machines, electric motors, and dynamos, in which the clutch-shoes are moved radially in a vertical plane against the inner periphery of the clutch-tread, second, to provide a friction-clutch in which the centrifugal force of the clutch-shoes is neutralized, and they are thereby prevented from locking themselves in operative clutch-coupling positions. I attain these objects by the mechanism illustrated in the accompanying drawings, in which—

Figure 1 is a side elevation of a friction-clutch coupler embodying my invention; and Fig. 2 is a section of Fig. 1 through the shaft-coupler tread-pulley, showing one arm in elevation. Fig. 3 is a perspective view of the shifting-lever.

Similar figures of reference refer to similar parts throughout the several views.

Referring to the drawings, the numeral 1 designates the driver-shaft, and 2 the driven shaft, of a cut-off coupling. Upon the driven shaft I secure, preferably by a key 3, a pulley, which I term the "coupling" tread-pulley. This pulley comprises a hub 5, from which arms or spokes project to a rim 7, which projects from the opposite side of the arms from the hub. The inner periphery of this rim is bored to the arms and forms the tread of the shoes of the clutch. The hub of the coupling tread-pulley is keyed to the driven shaft to stand even with its end and its rim projects over the driven-shaft, which abuts against the end of the driving-shaft. Upon the end of the driving-shaft I secure by a key 9 a long hub 10, which is positioned even with the end of the driving-shaft and abuts against the hub of the coupling tread-pulley. This hub is provided with a spider 11, which consists of a flange-body portion that radiates from the hub and terminates in preferably four arms 12, in the ends of which a box-shaped slideway 13 is formed by laterally-projecting oppositely-arranged sides 14, that emerge into ribs 15 and extend around the peripheral edges of the flange portion of the spider, and a cover 16, that is removably secured to the terminal ends and the sides of the arms 13 by bolts 17. In the box formed at the ends of the arms by the cover and sides of the arms I slidably mount a jaw 18, which consists of a rectangular-shaped shank having an enlarged jaw at its outer end. The shank of the jaw projects beyond the slideway of the box at both ends, and a transverse slot 22 is formed through the shank of the jaw in that portion of its length that stands normally centrally of the length of the box, and a slot is formed through one of the sides of the box opposite the slot 22 in the shank of the jaw. I extend a pin 24 through the shank and its slot. A lever 25 extends through the slot in the box, also into the slot in the recess of the shank of the jaw, and is pivotally mounted on the pin 24 by means of an oblong hole 26, formed in its end, through which the pin passes. The lever 25 is also pivotally secured to the edge of the box by a bolt 27. Upon the free end of the lever I secure a weight by a pin 28.

The jaw is provided with a curved face that is concentric to the inner periphery of the coupling tread-ring and is provided with upwardly-projecting lugs 29 at its opposite ends, and a shoe 30, which may be constructed of any suitable material, is fitted against the jaw between the edges 29 and secured thereto by bolts 31 or any suitable means which extend into the shoe from the bottom of the jaw. The lower end of the shank of the jaw is pivotally secured by a pin 32 to an eye 33, formed in one end of a right-hand-threaded eyebolt 34, the opposite end of which is threaded to a nut 35, which is provided with a counterbored chamber centrally of its length, at the end of the right-hand thread, of larger diameter than the thread. The opposite end of the nut is provided with a left-hand thread, that also extends to the chamber in which is threaded one end of a left-hand-threaded eyebolt 36, the opposite end of which contains an eyehole and is pivotally secured to the lugs 37. A check-nut 38 is placed on the rod 34 and screws against the nut 35. The lugs 37 form an integral part of a sleeve 39, which I term a "clutch-sleeve." This sleeve is slidably mounted on the hub of the spider and has preferably four sets of lugs—one set at each quarter of its circumference—to which are pivotally secured the four adjustable eyebolts 34 and 36, that connect this clutch-sleeve to the jaws 18 in the boxes of the arms of the spider. This clutch-sleeve is provided with a keyway 40, that extends axially through it, and a key 41 is secured to the hub of the spider. I preferably use as a key a machine-screw, which I thread into the hub of the spider at a point about centrally of the length of the sleeve, so that its head will project loosely into the keyway. The chuck-sleeve is thus feathered to slide axially on the hub of the spider and is prevented from turning on it by the key. It is thus always held in operative alinement with the jaw-adjusting rods. The outer end of the clutch-sleeve is provided with a circumferential groove 42, which I term a "shipper groove," in which I fit loosely and slidably two segmental shipper-shoes 43, which I preferably make of antifriction metal. These shoes are provided with trunnions 44, which fit into opposite sides of a shipping-ring 45, that fits loosely over the chuck-sleeve, thus securing the shoes on opposite sides of the shipper-slot from the opposite sides of the shipper-ring. From the trunnion-bearings two levers 46 and 47 extend in opposite directions. The lever 46 is pivotally secured at its end to any suitable support which the shipper-lever 47 depends within reach of an operation.

The operation of my improved friction-clutch coupler is as follows: The clutch is rotated by the driving-shaft and is shown in Figs. 1 and 2 in operative clutch-gripping relation to the clutch tread-ring, and to release the jaws of the clutch from the tread-ring it is only necessary to move the shipper-lever 47 in the direction of the arrow 48, which movement will slide the clutch-sleeve on the hub of the spider and move the lower ends of all the adjustable rods with it, thus moving the jaws away from the tread-ring and releasing the clutch. The adjusting-rods then stand at an angle to the jaws, as shown by the dotted line 50. In order to operate the clutch to grip the tread-ring, the shipper-lever is moved in the direction of the arrow 51. This straightens the adjusting-rods up so that their centers stand at right angles to the axis of the shaft and sleeve and in a straight line underneath the jaws, so that their pivotal centers are in right-angled alinement to the axis of the shafts, in which position the jaws are locked tight against the inner periphery of the tread-ring, the adjusting-rods being lengthened or shortened by the right and left hand nut, so that the jaws bear tightly against the tread-ring when the sleeve and rods are thrown in operative clutching position.

As the clutch generally rotates at a high rotative speed, the centrifugal force exerted in the jaws is considerable and tends to cause the jaws and shoes to creep into operative engagement with the tread-ring when they are uncoupled from it and to cause them to cling to it and resist being uncoupled when the shipper is moved to uncouple them. I entirely overcome this centrifugal action by means of the weighted arms, which when the jaws are released and drawn back they pivot on the bolt and are moved outward toward the rim by the jaw, which as it moves downward pushes the inner ends of the weighted lever toward the sleeve and their outer ends toward the rim, and thus when the jaws move out into coupling engagement with the tread-ring the weights are moved toward the coupling-sleeve, thus counteracting and neutralizing the centrifugal force of the jaw and permitting the clutch to be operated evenly and smoothly by the shipper-lever.

My improved clutch is simple, strong, and durable, and makes a very powerful friction-coupler.

Having described my invention, what I claim as new, and desire to secure by Letters Patent, is—

1. In a friction-clutch coupler, the combination with a shaft having a pulley thereon, of a driving-shaft in axial alinement with said pulley-shaft; a spider keyed on said shaft and comprising a hub portion provided with arms having guideways in their extremities, said spider being positioned on said shaft within the rim of the pulley; a sleeve secured to said shaft but slidably mounted thereon, a jaw having shank portions slidably secured in each guideway of said spider, an upward lip on the opposite end of each of said jaws, a friction-shoe secured to each jaw between said lips and adapted to bear against the inner periphery of the rim of said pulley, an eyebolt pivoted to the end of each shank of each jaw, an eyebolt pivoted to said sleeve in radial alinement with the shank of each jaw, right and left hand threads on the ends of said eyebolts, a right and left hand threaded nut operatively arranged on said threaded eyebolts to operatively adjust said shoe and jaw relative to the rim of said pulley, a slot through the shank of each jaw extending through each shank in the rotative path of said spider and of said jaws and shoes, a slot in the edge of each guideway registering with the said slot in each shank, a lever pivotally secured intermediate of its end in the slot in the edge of each guideway and having one end project into each slot in the shank of each jaw; an oblong hole in the end of each lever, a pin extending through each guideway and the oblong hole in each lever, thereby adjustably securing the end of said levers in the slots of the shanks of said jaws, and having the opposite end of said lever extend from said slots in the edge of said guideway and shank into the rotative plane of said spider and jaws and shoes and into the space between them and a suitable counterbalancing-weight secured to the free end of said levers, substantially as described.

2. A friction-clutch coupler, comprising a shaft having a pulley secured thereon; a driving-shaft in alinement with the pulley-shaft, having a spider positioned within the rim of the pulley, the hub of which is secured upon the said driving-shaft, while its extremities are provided with guideways; jaws which slide in the guideways; adjustable rods connected at one end to said jaws, a sleeve slidably secured on the hub of said spider and pivotally connected at one end to the opposite end of said adjustable rods, a circumferential groove in the opposite end of said sleeve, shoes which lie with said groove, a lever having a hoop portion which surrounds the grooved end of said sleeve, to which the said shoes are pivotally attached; the said lever being adapted to slide the sleeve so as to cause the sliding jaws to engage the rim of the pulley, and weighted levers pivotally secured to the guideways of said spider and loosely secured to said jaws at one end and provided with a weight at their free ends and projecting at substantially right angles from the operative friction gripping movement of said jaws relative to said pulley and into the axial center of the radial rotative plane of said jaws and spider and rearward of the direction of rotative movement of said jaws whereby said weighted levers swing radially in the rotative plane of said spider and jaws from their pivotal connection on said guideway to and from the inner periphery of said pulley and counteract the centrifugal force of said jaws toward the rim of said pulley, substantially as described.

In testimony whereof I affix my signature in presence of two witnesses.

THOMAS CORNELIUS WALKER, JR.

Witnesses:
WILBERT L. STRAWN,
ARTHUR A. SELLECK.